United States Patent

Tajima et al.

[11] Patent Number: 5,811,904
[45] Date of Patent: Sep. 22, 1998

[54] PERMANENT MAGNET DYNAMO ELECTRIC MACHINE

[75] Inventors: Fumio Tajima, Juou-machi; Yutaka Matsunobu; Shouichi Kawamata, both of Hitachi; Suetaro Shibukawa, Hitachinaka; Osamu Koizumi, Ibaraki-machi; Keiji Oda, Hitachinaka, all of Japan

[73] Assignees: Hitachi, Ltd., Tokyo; Hitachi Car Engineering Co., Ltd., Ibaraki, both of Japan

[21] Appl. No.: 821,541

[22] Filed: Mar. 21, 1997

[30] Foreign Application Priority Data

Mar. 21, 1996 [JP] Japan .................................. 8-064352
Mar. 29, 1996 [JP] Japan .................................. 8-076748

[51] Int. Cl.$^6$ ................................................ H02K 21/12
[52] U.S. Cl. .......................... 310/156; 310/214; 310/241
[58] Field of Search .................................. 310/156, 214, 310/241

[56] References Cited

U.S. PATENT DOCUMENTS

| | | | |
|---|---|---|---|
| 5,475,277 | 12/1995 | Johnson | 310/156 |
| 5,488,260 | 1/1996 | Heyraud | 310/156 |
| 5,548,172 | 8/1996 | Kliman et al. | 310/156 |
| 5,581,140 | 12/1996 | Futami | 310/156 |
| 5,659,217 | 8/1997 | Perterson | 310/156 |

*Primary Examiner*—Steven L. Stephan
*Assistant Examiner*—Thanh Lam
*Attorney, Agent, or Firm*—Antonelli, Terry, Stout & Kraus, LLP

[57] ABSTRACT

In order to realize a permanent magnet dynamo electric machine which permits a high speed of rotation, the permanent magnet dynamo electric machine includes a stator 20 having a stator iron core 22 in which a stator winding 24 is wound, and a rotor 30 facing the inner circumference of the stator 20 and rotatably supported thereby, the rotor 30 having a rotor iron core 32 and a plurality of permanent magnets 36 arranged inside the rotor iron core 32 so as to face the stator iron core 22, wherein the rotor iron core 32 is provided with the same number of permanent magnet insertion holes 34 as the number of permanent magnets 36 for receiving the same at positions where the ratio R1/R0 is equal to or more than 0.85, wherein R0 is the radius of the rotor 30 and R1 is the radius of an imaginary circle drawn by inscribing the faces of the plurality of permanent magnets 36 at the side remote from the stator 20.

8 Claims, 7 Drawing Sheets

etc. …

PERMANENT MAGNET DYNAMO ELECTRIC MACHINE

BACKGROUND OF THE INVENTION

The present invention relates to a permanent magnet dynamo electric machine and, in particular, to a permanent magnet dynamo electric machine having embedded permanent magnets inside the rotor thereof.

There are two types of conventional permanent magnet dynamo electric machines. In one type, the permanent magnets are secured on the circumference of the rotor thereof, and in the other type the permanent magnets are embedded inside the rotor thereof. JP-A-5-76146 (1993) discloses a structure of the latter type.

In the permanent magnet dynamo electric machine having a structure of the latter type, when the rotor thereof is rotating, centrifugal forces acting on the respective permanent magnets are applied to portions of the rotor members located along the outer circumferences of the respective permanent magnets. Further, the rotor members themselves are subjected to centrifugal forces. Portions which are located at both circumferential ends of the rotor members, namely the bridge portions, support the above mentioned two sorts of centrifugal forces. Therefore, in order to withstand centrifugal forces caused by high speed rotation, the thickness of the bridge portions has to be increased.

On the other hand, when the thickness of the bridge portions is increased, magnetic fluxes generated by the permanent magnets leak via the bridge portions to the surrounding iron core, and the amount of magnetic fluxes transferred from the surface of the rotor to the stator thereof is decreased. Torque generated by the permanent magnet dynamo electric machine depends on the amount of magnetic fluxes transferred from the permanent magnets to the stator; therefore, if the magnetic flux leakage increases, the torque generated decreases and the efficiency of the permanent magnet dymano electric machine is reduced accordingly.

SUMMARY OF THE INVENTION

An object of the present invention is to provide a permanent magnet dynamo electric machine having embedded permanent magnets inside the rotor thereof, which permits high speed rotation and enhances the efficiency thereof by suppressing the magnetic flux leakage via the bridge portions, while limiting loading due to centrifugal forces applied to the bridge portions.

The object of the present invention is achieved by a permanent magnet dynamo electric machine comprising a stator having a stator iron core in which a stator winding is wound, and a rotor facing the inner circumference of the stator and rotatably supported thereby, the rotor being constituted by a columnar rotor iron core, a shaft provided along the rotation axis of the rotor iron core and a plurality of permanent magnets arranged in a ring along the circumference of the rotor iron core so as to face the stator iron core, characterized in that, the rotor iron core is provided with the same number of permanent magnet insertion holes as the number of permanent magnets for receiving the same at positions where the ratio R1/R0 is equal to or more than 0.85, wherein R0 is the radius of the rotor and R1 is the radius of an imaginary circle drawn by inscribing the faces of the plurality of permanent magnets at the side remote from the stator.

DESCRIPTION OF THE PREFERRED EMBODIMENTS

Figure 1:
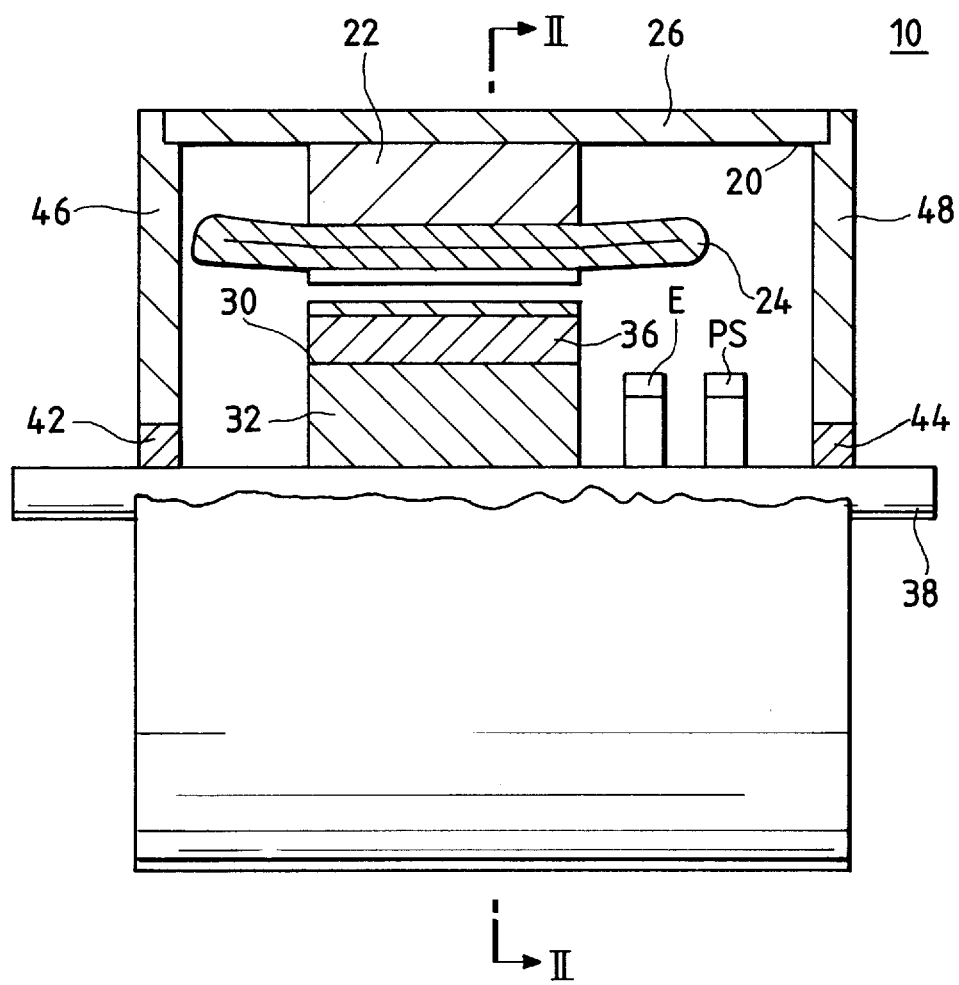
FIG. 1 is a partial cross sectional view of a permanent magnet dynamo electric machine seen from the front thereof, representing one embodiment according to the present invention.

In FIG. 1, a stator 20 in a permanent magnet dynamo electric machine 10 is constituted by a stator iron core 22, a poly phase stator winding 24 wound in the stator iron core 22 and a housing 26 which fixedly secures the stator iron core 22 at the inner circumferential face thereof.

A rotor 30 is constituted by a rotor iron core 32, a shaft 38 therefor and a plurality of permanent magnets 36.

The rotor iron core 32 is formed by laminating in the axial direction a plurality of sheets of magnetic material having a high permeability, such as silicon steel sheet. As will be seen from FIGS. 1 and 2, the respective lamination sheets are provided with punched through permanent magnet insertion holes 34 and a punched through hole for receiving the shaft 38 in the axial direction, and the respective permanent magnets 36 and the shaft 38 are inserted in the corresponding punched through holes.

The shaft 38 is rotatably held by bearings 42 and 44 with respect to the stator 20. The bearings 42 and 44 are respectively supported by end brackets 46 and 48, and these end brackets 46 and 48 are fixedly secured to the respective ends of the housing 26.

At one side of the rotor 30, a magnetic pole position detector PS for detecting positions of the permanent magnets 36 in the rotor 30 and an encoder E for detecting position of the rotor 38 are arranged. The permanent magnet dynamo electric machine 10 is operated and controlled through a control unit (not shown) depending on signals from the magnetic pole position detector PS and the encoder E.

Figure 2:
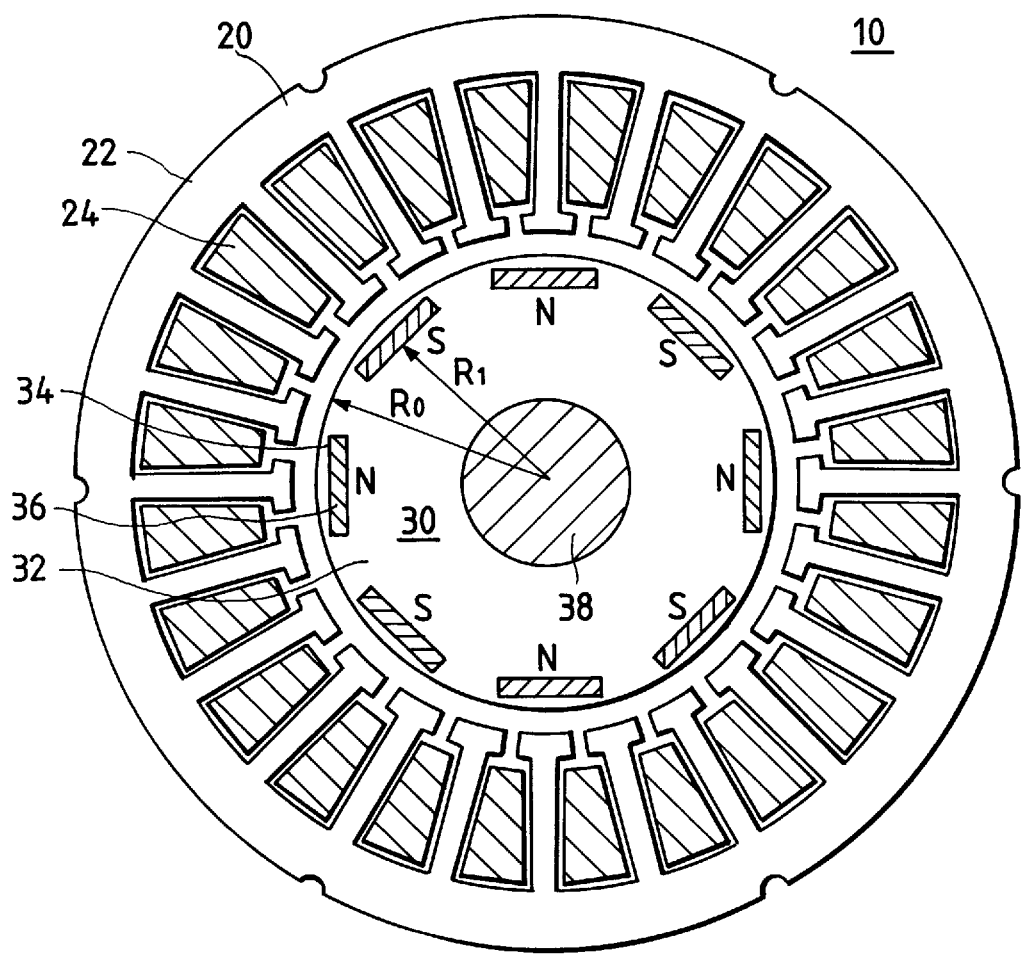
FIG. 2 is a cross sectional view taken along the line II—II in FIG. 1.

FIG. 2 is a cross sectional view taken along the line II—II and seen in the arrowed direction in which illustration of the housing 26 is omitted.

The rotor iron core 32 is provided with eight permanent magnet insertion holes 34 having a rectangular shape in cross section, which holes are arranged in a ring as a whole so as to face the stator iron core 22, and eight permanent magnets 36 having substantially the same configuration are inserted in the respective permanent magnet insertion holes 34. Since the cross section of the respective permanent magnets 36 is rectangular, as seen from the drawings, the respective permanent magnets 36 are accurately dimensioned in comparison with permanent magnets having an arcuate cross section, thereby a permanent magnet dynamo electric machine, which permits a high speed rotation without any balancing work on the rotor, is provided.

The eight permanent magnets 36 are positioned with the same spacing along the circumference of the rotor iron core 32 in such a manner that the polarity of adjacent magnets is opposite to each other. Further, along the center portion of the rotor iron core 32, the shaft 38 is inserted. In the present embodiment, it is assumed that the permanent magnet type rotor 30 is designed to rotate in a counter clockwise direction.

Figure 3:
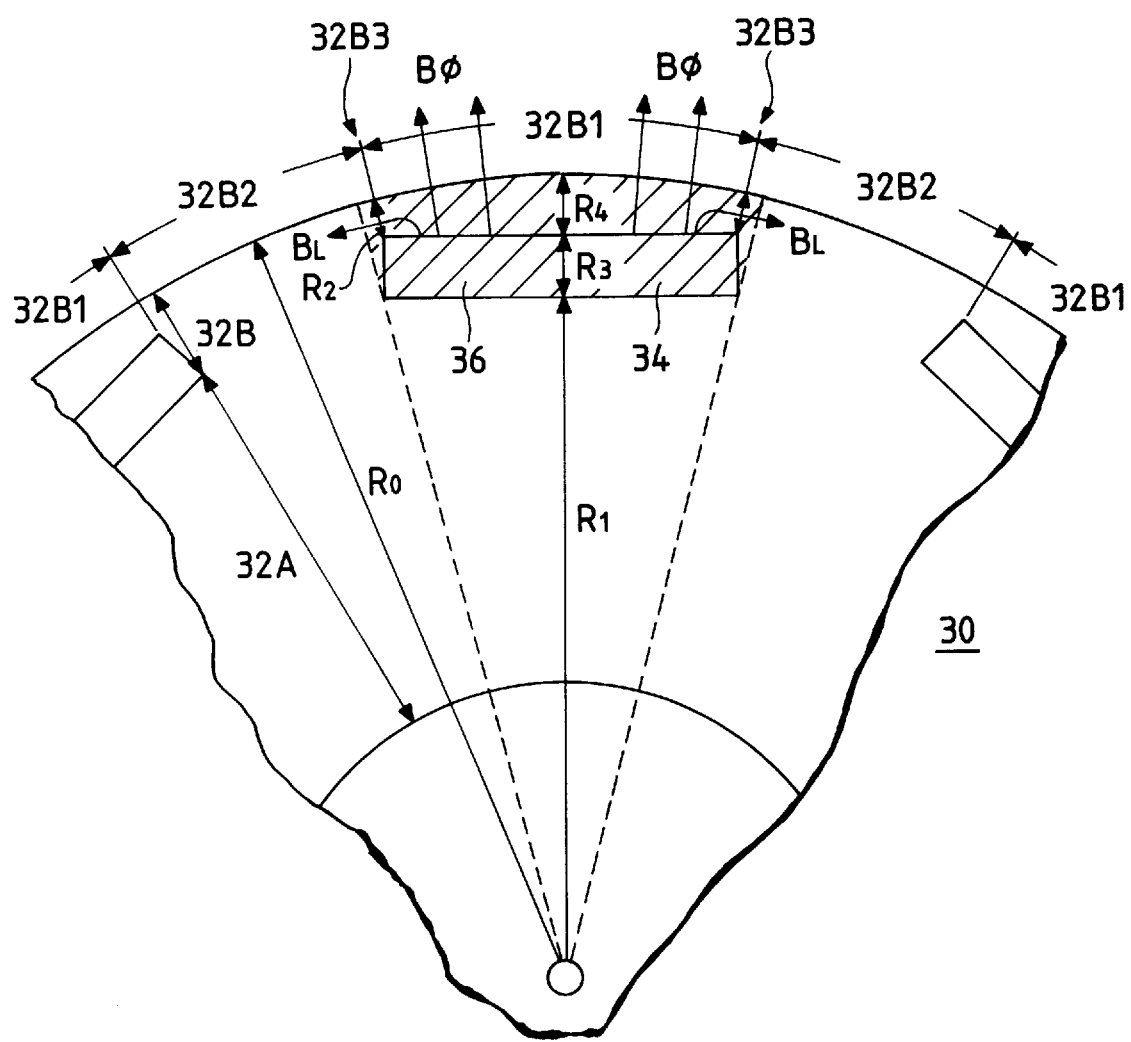
FIG. 3 is an enlarged view of a major portion shown in FIG. 2.

FIG. 3 is an enlarged view of a part of FIG. 2.

When classifying the area of the rotor iron core 32 into two parts in its radial direction, one part is a yoke portion 32A at the inner circumferential side and the other part is an outer circumferential portion 32B. Further, the outer circumferential portion 32B is further classified into three portions, including a magnetic pole piece portion 32B1, auxiliary magnetic pole piece portion 32B2 and a bridge portion 32B3.

The magnetic pole piece portion 32B1 is located at the immediate outer circumference of the permanent magnet 36 and is an area constituting a magnetic circuit which passes magnetic flux B$\phi$ generated by the permanent magnet 36 to the side of the stator 20 via an air gap between the rotor 30 and the stator 20.

The auxiliary pole piece portion 32B2 is an area between two adjacent magnetic pole piece portions 32B1 which permits to passage of magnetic fluxes generated by magneto motive forces of the stator winding 24 while bypassing the magnetic circuits for the permanent magnets 36. When a composite vector of armature magneto-motive forces caused by currents flowing through the stator winding 24 is controlled by the control unit, not shown, so as to be directed in the rotating direction with reference to the center position of the auxiliary magnetic pole piece portion 32B2, the permanent magnet dynamo electric machine 10 can generate a torque due to the auxiliary pole piece portion 32B2, in addition to the torque due to the permanent magnets 36 and, thereby, can operate as a high torque electric motor.

The bridge portion 32B3 is a boundary portion between the magnetic pole piece portion 32B1 and the auxiliary magnetic pole piece portion 32B2 and also represents a portion where the outer circumference of the permanent magnets 36 is nearest to the outer circumference of the rotor iron core 32.

When the rotor 30 is rotated, respective elements constituting the rotor 30 are subjected to centrifugal forces. Among these centrifugal forces, the centrifugal forces acting on the permanent magnets 36 and the magnetic pole piece portions 32B1 located at the outer circumferential side of the permanent magnets 36 are concentrated on the bridge portions 32B3. Therefore, the bridge portions 32B3 are likely to be broken.

As a countermeasure to such a problem, it is have been proposed to increase the thickness of the bridge portions 32B3; however, with such a countermeasure, the leakage flux $B_L$ via the bridge portion 32B3 increases to thereby decrease the torque generated by the permanent magnet dynamo electric machine. If a predetermined torque is required to be generated even with the increased, leakage flux $B_L$, the size of the permanent magnet dynamo electric machine itself has to be increased, which prevents a high speed rotation thereof.

Therefore, in accordance with the present invention, the permanent magnet insertion holes 34 are formed in the rotor 30 at positions where the ratio R1/R0 is equal to or more than 0.85, wherein R0 is the radius of the rotor 30 and R1 is the radius of an imaginary circle drawn by inscribing the faces of the plurality of permanent magnets 36 at the side remote from the stator 20.

In the embodiment shown in FIG. 3, in order to fulfill the above condition R0 and R1 are respectively set at 57.5 mm and at 49.5 mm. Further, the thickness R3 of the permanent magnets 36 in the radial direction, the maximum thickness R4 of the magnetic pole piece portion 32B1 in the radial direction and the thickness R2 of the bridge portion 32B3 in the radial direction are respectively set at 4 mm, 4 mm and 2 mm.

When the ratio R1/R0 is determined to be equal to or more than 0.85, the centrifugal force caused by the permanent magnets 36 and the magnetic pole pieces 3281 is reduced to less than ½ of the centrifugal force caused by the entire rotor 30, and the load which has to be borne by the bridge portion 32B3 is decreased. Further, it becomes unnecessary to needlessly increase the thickness R2 of the bridge portions 32B3 in comparison with the construction where the ratio R1/R0 is set less than 0.85, and so the leakage flux $B_L$ is reduced. Accordingly, a reduction in the generating torque is prevented and a high speed rotation is realized.

Further, in order to achieve a high speed rotation, it is preferable to reduce the thickness of the permanent magnets 36 as much as possible. In particular, in the present embodiment, the thickness R3 of the permanent magnets 36 is determined to be equal to or less than two times the thickness R2 of the bridge portions 32B3. Thereby, a permanent magnet dynamo electric machine which can rotate at a high speed is realized.

R1/R0 ratio of the structure shown in FIG. 1 of JP-A-5-76146 (1993) as indicated in the introductory portion of the present specification is 0.72 (2.1/2.9). With this conventional structures, the centrifugal forces concentrated at the bridge portions amount to 1.5 times as that of the present embodiment as shown in FIG. 3, and therefore, the thickness of the bridge portions has to be increased, which as a matter of course increases leakage fluxes passing therethrough.

With the structure of the present embodiment, the leakage fluxes are reduced, thereby a reduction in the generation of torque in the permanent magnet dynamo electric machine is prevented. As a result, the size and weight of the permanent magnet dynamo electric machine are reduced, thereby providing a permanent magnet dynamo electric machine which is able to rotate at a high speed.

Figure 4:
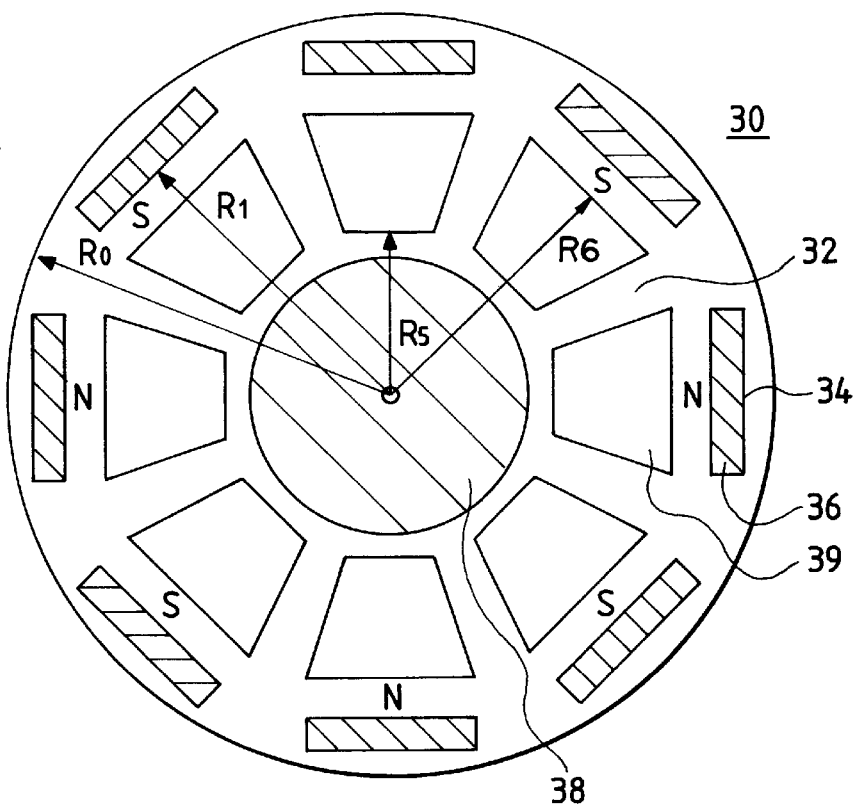
FIG. 4 is a cross sectional view of a rotor of a permanent magnet dynamo electric machine representing another embodiment according to the present invention.

In FIG. 4, the rotor 30 according to the FIG. 2 embodiment is provided additionally with a plurality of vents 39. Since the permanent magnets 36 are arranged at the outer circumferential side of the rotor 30, the magnetic flux density in the yoke portion 32A at the inner circumferential side of the rotor iron core 32 is extremely low. Therefore, if the same number of vents 39 as the number of the permanent magnets 36 are formed in the yoke portion 32A, the amount of fluxes generated by the rotor 30 is substantially unaffected.

The radial distance R5 of to the face at the inner circumferential side and the radial distance R6 to the face of the outer circumferential side of the vent 39 are respectively set at 27 mm and 42 mm and the circumferential width of the face at the outer circumference of the vent 39 is substantially equal to the width of the permanent magnet 36. Thereby, the total weight of the rotor 30 of the present embodiment is reduced by 27% in comparison with the FIG. 2 embodiment in where there is no provision of the vents 39.

As a result, the weight of the rotor 30 is lightened, and the entire weight of the permanent magnet dynamo electric machine is accordingly reduced, which permits a high speed rotation thereof. Further, the loads on the bearings 42 and 44 are also lightened.

It is effective to set the total opening area of all the vents 39 to be more than 20% of the cross sectional area of the rotor 30. Further, it is preferable for the number of the vents 39 to be equal to the number of permanent magnets 36. However, the number of vents 39 can be less than the number of permanent magnets 36. In such an instance, it is preferable to set the number of the vents 39 at one/permanent magnet 36 with a view toward maintaining the rotation balance thereof.

Further, the provision of the vents 39 is particularly effective when permanent magnets 36 of rare earth elements are used, in which the magnetic flux reduces significantly due to temperature rise thereof.

Namely, through the provision of the same number of vents 39 as the number of permanent magnets 36, cooling air is introduced into the inner circumference of the rotor 30, and the temperature of the permanent magnets 36 is kept low, so that the amount of magnetic fluxes caused thereby is increased and the rotation torque thereby can correspondingly be increased.

Figure 5:
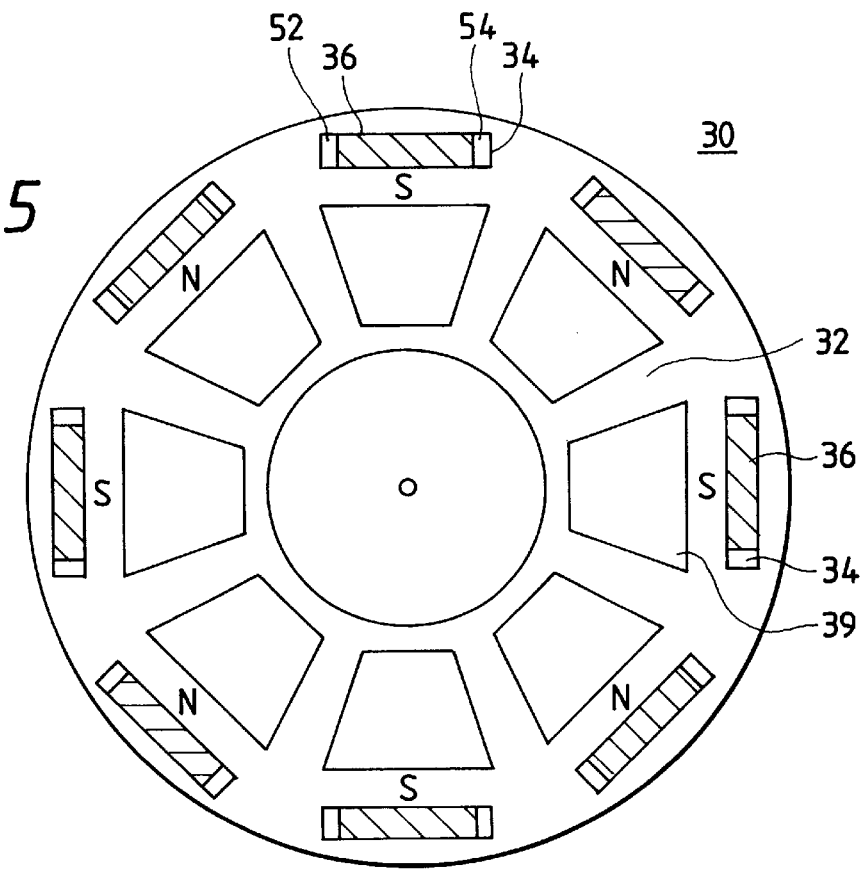
FIG. 5 is a cross sectional view of a rotor of a permanent magnet dynamo electric machine representing still another embodiment according to the present invention.

FIG. 5 is a modification of the FIG. 4 embodiment in which the circumferential length of the permanent magnet insertion holes 34 is selected to be longer than that of the permanent magnets 36 to thereby form gaps 52 and 54 at the respective bridge portions 32B3. The gaps 52 and 54 at the bridge portions 32B3 provided at the rotor iron core 32 can be filled with a material such as an adhesive. Further, the clearances at the radially outer circumference of the permanent magnets 36 can likely be filled with a material such as an adhesive, thereby a tough rotor structure is realized.

Figure 6:
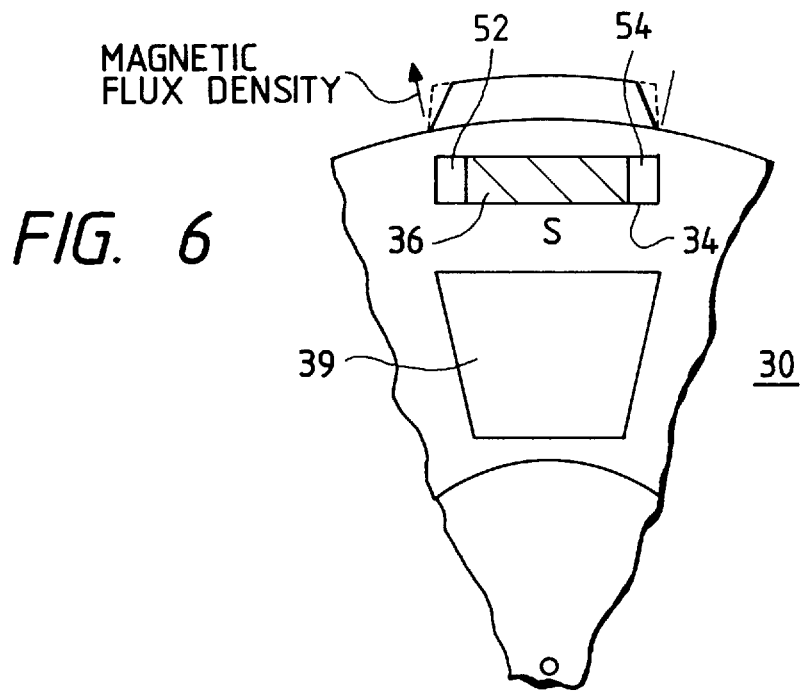
FIG. 6 is a diagram which shows a magnetic flux density distribution along an air gap in the permanent magnetic dynamo electric machine shown in FIG. 5.

FIG. 6 is a view for explaining the magnetic flux density distribution in the FIG. 5 embodiment. As illustrated by a solid line in FIG. 6, the magnetic flux density generated by the permanent magnet 36 along the air gap facing the permanent magnet 36 is uniform, and the magnetic flux densities at both end portions of the permanent magnet 36 are gradually inclined in the circumferential direction because of the existence of the gaps 52 and 54. Dotted lines in FIG. 6 show an assumed magnetic flux density distribution when the length of the permanent magnet insertion hole 34 is substantially equal to that of the permanent magnet 36 and shows that the magnetic flux density steeply rises at both end portions of the permanent magnet 36.

Through the provision of the gaps 52 and 54 for the bridge portions 32B3 between the magnetic pole pieces 32B1 and the auxiliary magnetic pole pieces 32B2 and at the inner circumferential side thereof, the variation of magnetic flux density along the air gap in the circumferential direction is gradual, and so generation of rippling torque and cogging torque can be reduced.

Further, with the structure according to the present embodiment, the amount of permanent magnets to be used is also reduced. Since the permanent magnets of rare earth elements are expensive, the reduction in the number permanent magnets is effective for reducing the cost of the permanent magnet dynamo electric machine. Even when the number of permanent magnets is reduced according to the present embodiment, because of the existence of the gaps 52 and 54 at both circumferential ends of the permanent magnets 36, possible leakage fluxes toward the auxiliary magnetic pole pieces 32B3 are reduced, and thereby a possibility of torque reduction is prevented.

Figure 7:
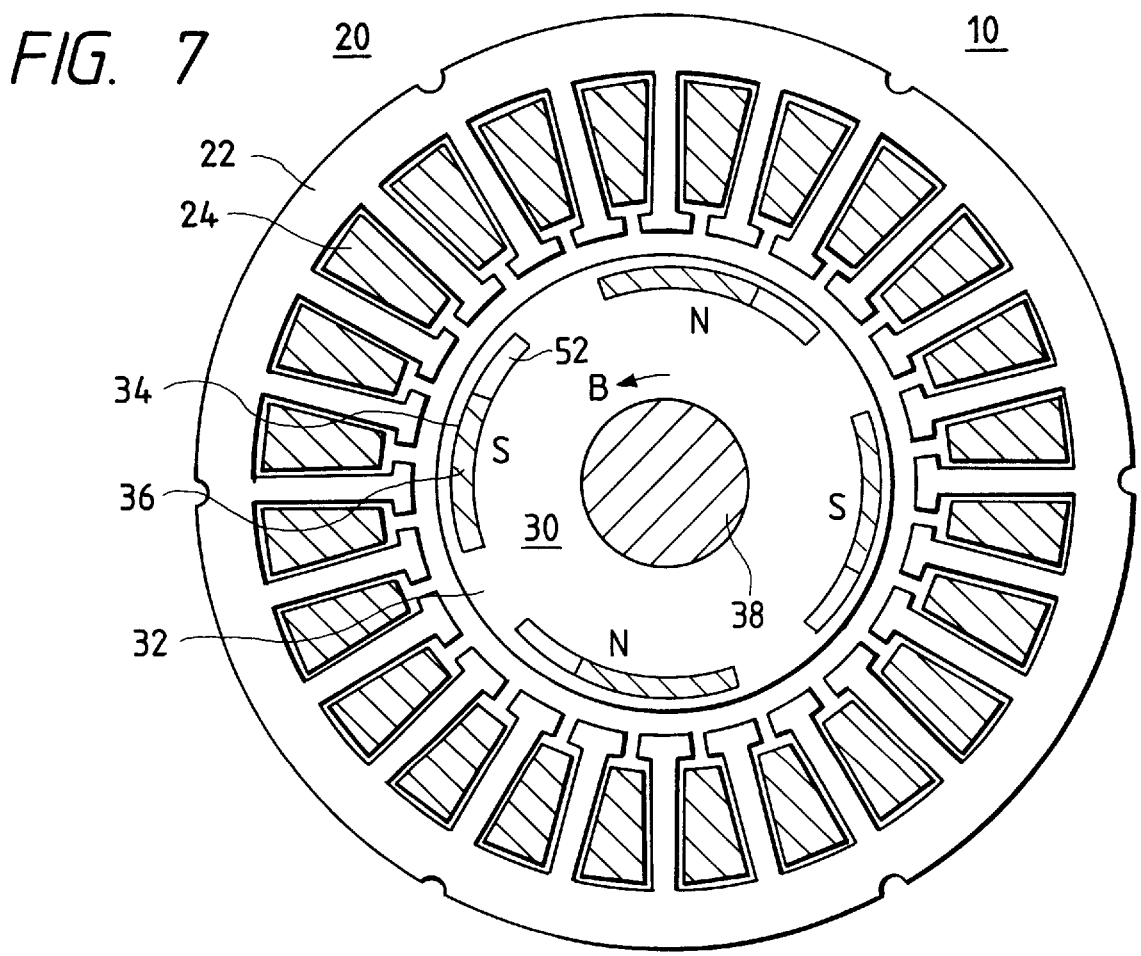
FIG. 7 is a cross sectional view of a rotor of a permanent magnet dynamo electric machine representing yet another embodiment according to the present invention.

FIG. 7 is a modification of the FIG. 5 embodiment in which a single gap 52 is provided at one circumferential end of each permanent magnet and further the permanent magnets 36 are configured in an arcuate shape.

In the present embodiment, since it is assumed that the rotor 30 is designed to be rotated in only one direction, as indicated by the arrow B, the permanent magnets 36 are inserted into the permanent magnet insertion holes 34 while shifting the permanent magnets 36 toward one side in the rotation direction B.

When an electrically driven motor vehicle runs backward, the wheels are rotated in the reverse direction by means of a change gear mechanism. Therefore, it is sufficient if the permanent magnet dynamo electric machine is designed to be rotatable only in one direction, and thus, if the rotating torque generated by the permanent magnet dynamo electric machine in the predetermined rotation direction is also sufficient, a small rotating torque in the opposite direction (clockwise direction) to the arrowed direction B can be acceptable.

Accordingly, as illustrated in FIG. 7, the permanent magnets 36 are inserted in the permanent magnet insertion holes 34 in such a manner as to be shifted toward the rotating direction B, and the gap portions 52 are formed at positions adjacent to the counter-rotating direction of the permanent magnets 36, so that the possibility of magnetic flux leakage along the gap portions 52 is suppressed. Similarly, centrifugal forces caused by the permanent magnets 36 are reduced, which realizes structure suitable for a high speed rotation.

The gap portions 52 formed in the counter-rotating direction of the permanent magnets 36 are, for example, filled with a material, such as varnish, whereby the rotor structure is strengthened.

Figure 8:
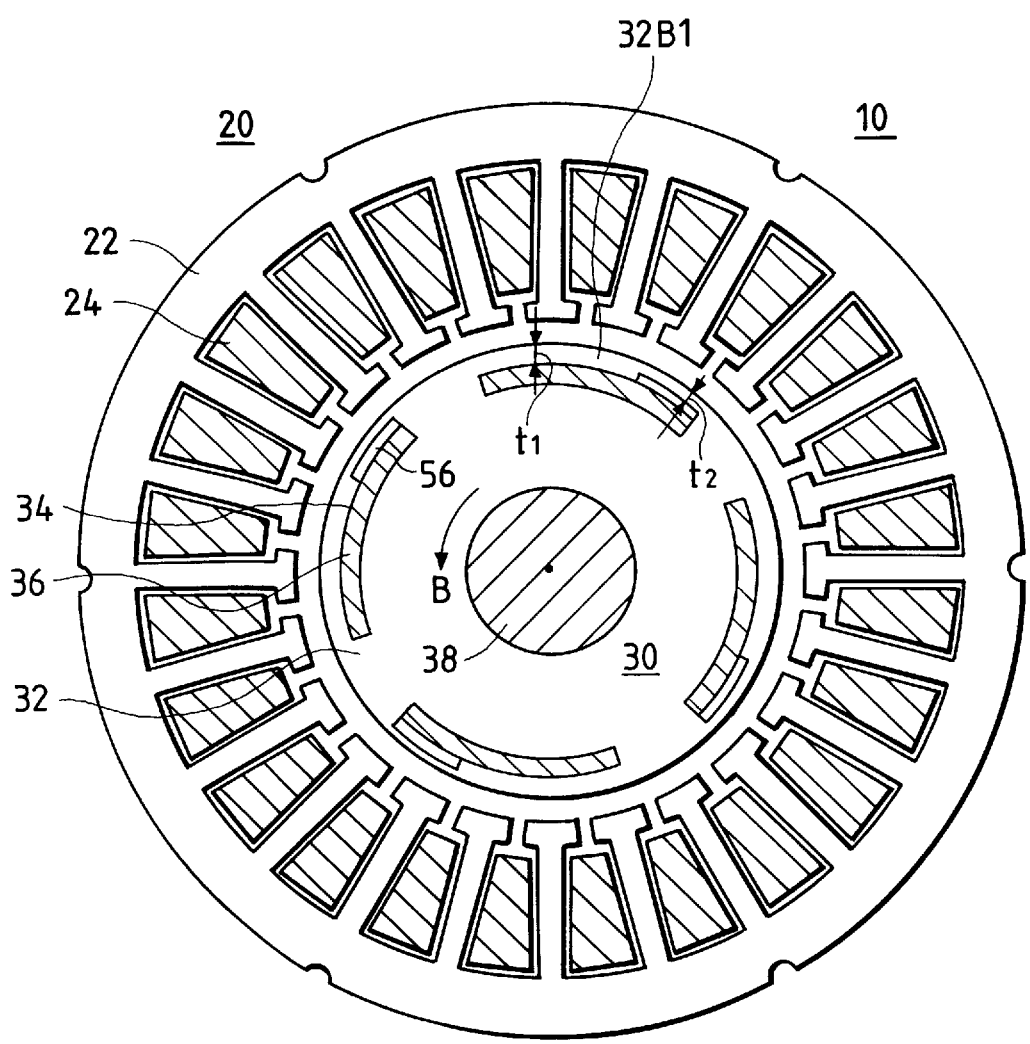
FIG. 8 is a cross sectional view of a rotor of a permanent magnet dynamo electric machine representing a further embodiment according to the present invention.

FIG. 8 is a modification of the FIG. 7 embodiment in which gap portions 56 are formed in the opposite direction to the rotating direction B of the permanent magnet insertion holes 34 along the outer circumferential side thereof. The permanent magnet dynamo electric machine is designed to be rotatable only in the arrowed direction B like the FIG. 7 embodiment.

The permanent magnet insertion holes 34 are configured to have a larger opening than the permanent magnet 36 to be inserted at the opposite side to the rotating direction B of the rotor 20. As a result, rotating torques generated by the permanent magnet dynamo electric machine are sufficiently large for the rotating direction B, but are small for the direction (clockwise direction) opposite the arrowed direction B. However, through the formation of the gap portions 56 in the counter-rotating direction of the permanent magnets 36, magnetic flux leakage along the gap portions 56 is timiled and the magnetic fluxes generated by the permanent magnets 36 are effectively utilized.

Further, in the present embodiment, the radial direction thickness of the magnetic pole pieces 32B1, which are located along the outer circumference of the permanent magnet 36, is different at various positions along the circumference thereof. More specifically, the thickness t1 of the magnetic pole piece 32B1 at the counter clockwise direction side is thicker than the thickness t2 of the magnetic pole piece 32B1 at the clockwise direction side. By thus constituting the permanent magnet insertion holes 34, during no load operation of the permanent magnet dynamo electric machine, magnetic fluxes leak via the magnetic pole pieces 32B1 at the clockwise direction B side to the yoke portion of the rotor iron core 32 and its induced voltage is limited to a low value. Accordingly, at the time of an inverter failure during a high speed rotation of the permanent magnet dynamo electric machine, a possible large current flow into a battery is prevented, and thereby provisions for such devices as contactors can be omitted.

Figure 9:
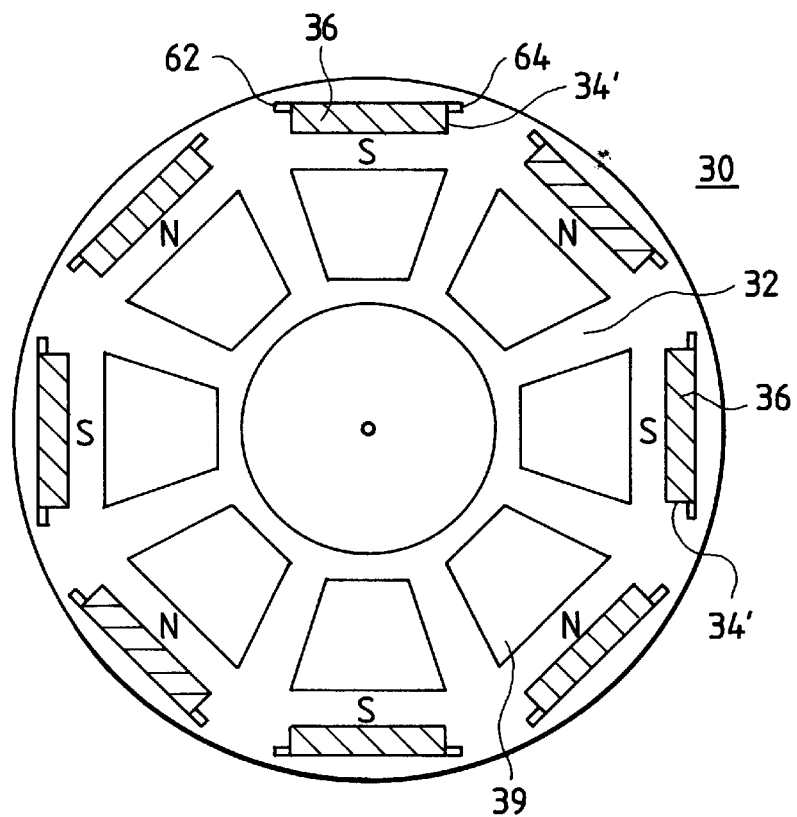
FIG. 9 is a cross sectional view of a rotor of a permanent magnet dynamo electric machine representing a still further embodiment according to the present invention.

FIG. 9 shows another modification of the FIG. 4 embodiment in which a pair of slits 62 and 64 are formed at both ends of the permanent magnet insertion holes 34.

These slits 62 and 64 correspond to the gaps 52 and 54 as shown in FIG. 5, but are narrowed along their radial direction so as to facilitate the positioning of the permanent magnets 36 in their circumferential direction.

When the permanent magnets 36 are inserted into the permanent magnet insertion holes 34', the permanent magnets 36 are attracted to the side of near-by magnetic material by their attraction forces and rest on the magnetically stable inner diameter side thereof, which facilitates injection of adhesives, such as varnish, onto the outer circumferential side of the permanent magnets 36. Such varnish limits a possible mechanical contact between the permanent magnets 36 and the magnetic pole pieces 32B1 and contributes to provision of a permanent magnet dynamo electric machine suitable for high speed rotation.

Figure 10:
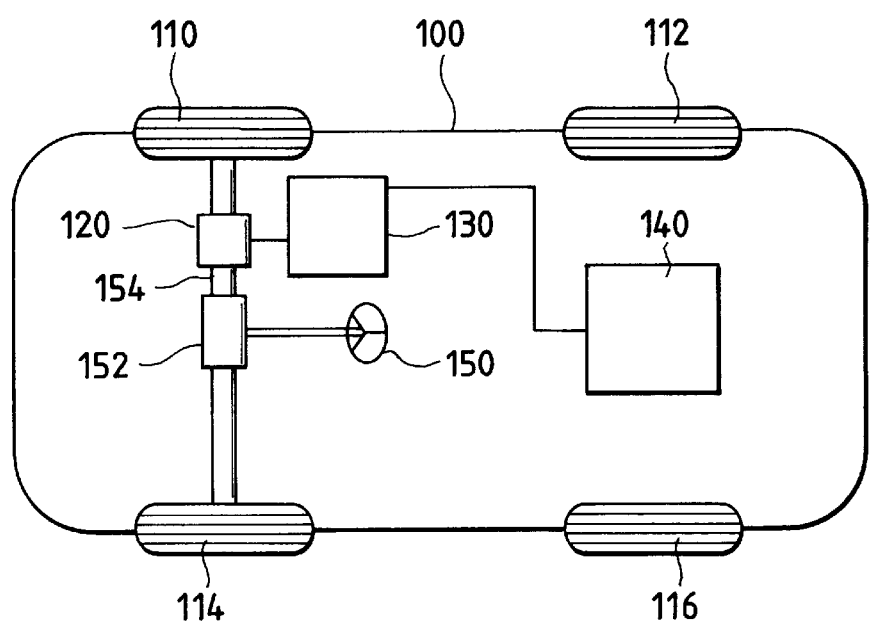
FIG. 10 is a block diagram of an electric car mounting a permanent magnet dynamo electric machine according to the present invention.

FIG. 10 is a block diagram of an electric car mounting a permanent magnet dynamo electric machine according to the present invention.

A body 100 of the electric car is supported by four wheels 110, 112, 114 and 116. Since the electric car is a front wheel drive vehicle in this example, a permanent magnet dynamo electric machine 120 is coupled to a front axle 154 via a change gear mechanism not shown. The driving torque of the permanent magnet dynamo electric machine 120 is controlled by a control unit 130. A battery 140 is provided as a power source for the control unit 130 and the electric power of the battery 140 is fed to the permanent magnet dynamo electric machine 120 via the control unit 130 to drive the permanent magnet dynamo electric machine 120 and to thereby rotate the wheels 100 and 114. Rotation of a steering wheel 150 is transmitted to the two wheels 110 and 114 via a steering gear 152 and a mechanism including a tie rod and a knuckle arm, so that the steering angle of the wheels 100 and 114 is varied.

When the permanent magnet dynamo electric machine according to the present invention is employed in an electrically driven motor vehicle, in particular, to an electric car, a permanent magnet dynamo electric machine driving device of small size and light weight having a high efficiency can be obtained and an electric car having a long running distance per one charging operation is realized.

Further, the permanent magnet dynamo electric machine can also be used for driving an electric locomotive.

We claim:

1. A permanent magnet dynamo electric machine comprising a stator having a stator iron core in which a stator winding is wound, and a rotor facing the inner circumference of said stator and rotatably supported thereby, said rotor being constituted by a columnar rotor iron core, a shaft provided along the rotation axis of said rotor iron core and a plurality of permanent magnets arranged in a ring along the circumference of said rotor iron core, wherein a number of permanent magnet insertion holes equal to the number of permanent magnets are provided within said rotor iron core, and the magnets are positioned within the insertion holes at positions at which a ratio R1/R0 is equal to or more than 0.85, where R0 is the radius of said rotor and R1 is the radius of an imaginary circle drawn by inscribing the faces of the plurality of permanent magnets at the side thereof remote from said stator.

2. A permanent magnet dynamo electric machine according to claim 1, wherein the thickness R3 of said permanent magnets is selected to be less than two times the thickness R2 of a bridge portion in said rotor iron core forming a boundary portion between a magnetic pole piece portion located along the radially outer edge of said insertion holes and an auxiliary magnetic pole piece portion located circumferentially adjacent to said magnetic pole piece portion.

3. A permanent magnet dynamo electric machine comprising a stator having a stator iron core in which a stator winding is wound, and a rotor facing the inner circumference of said stator and rotatably supported thereby, said rotor being constituted by a columnar rotor iron core, a shaft provided along the rotation axis of said rotor iron core and a plurality of permanent magnets arranged in a ring along the circumference of said rotor iron core, wherein a number of permanent magnet insertion holes equal to the number of permanent magnets are provided within said rotor iron core, and the magnets are positioned within the insertion holes at positions at which a ratio R1/R0 is equal to or more than 0.85, where R0 is the radius of said rotor and R1 is the radius of an imaginary circle drawn by inscribing the faces of the plurality of permanent magnets at the side thereof remote from said stator, and wherein said rotor iron core is further provided with a plurality of vents between said shaft and said permanent magnet insertion holes.

4. A permanent magnet dynamo electric machine comprising a stator having a stator iron core in which a stator winding is wound, and a rotor facing the inner circumference of said stator and rotatably supported thereby, said rotor being constituted by a columnar rotor iron core, a shaft provided along the rotation axis of said rotor iron core and a plurality of permanent magnets arranged in a ring along the circumference of said rotor iron core, wherein a number of permanent magnet insertion holes equal to the number of permanent magnets are provided within said rotor iron core, and the magnets are positioned within the insertion holes at positions at which a ratio R1/R0 is equal to or more than 0.85, where R0 is the radius of said rotor and R1 is the radius of an imaginary circle drawn by inscribing the faces of the plurality of permanent magnets at the side thereof remote from said stator, and wherein the circumferential length of said permanent magnet insertion holes is longer than that of said permanent magnets so that, when said permanent magnets are inserted into the corresponding permanent magnet insertion holes, a pair of gaps are formed at both ends of each of said permanent magnets.

5. A permanent magnet dynamo electric machine according to claim 4, wherein said gaps are filled with a resin material.

6. A permanent magnet dynamo electric machine according to claim 1, wherein each of said permanent magnet insertion holes is provided with a pair of slits at both circumferential ends thereof.

7. A permanent magnet dynamo electric machine according to claim 1, wherein a single gap is provided for each of said permanent magnets circumferentially adjacent thereto at the side of the insertion hole in the anti-rotating direction of said rotor.

8. A permanent magnet dynamo electric machine according to claim 1, wherein a single gap is provided for each of said permanent magnets radially adjacent thereto at the side of the insertion hole in the anti-rotating direction of said rotor.

* * * * *